US008527119B2

(12) United States Patent
Chaptal et al.

(10) Patent No.: US 8,527,119 B2
(45) Date of Patent: Sep. 3, 2013

(54) METHOD AND DEVICE FOR OPTIMIZING A TAKEOFF PROCEDURE OF AN AIRCRAFT

(75) Inventors: Jérôme Chaptal, Toulouse (FR); Rosa Maria Torres Calderon, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 287 days.

(21) Appl. No.: 12/872,264

(22) Filed: Aug. 31, 2010

(65) Prior Publication Data

US 2011/0060485 A1    Mar. 10, 2011

(30) Foreign Application Priority Data

Sep. 4, 2009    (FR) ...................... 09 04202

(51) Int. Cl.
  *G06F 19/00*    (2011.01)
  *G01C 23/00*    (2006.01)
(52) U.S. Cl.
  USPC ...................... 701/15; 701/7; 701/3
(58) Field of Classification Search
  USPC .................. 701/15, 7, 3
  See application file for complete search history.

(56) References Cited

U.S. PATENT DOCUMENTS

| 4,700,302 | A | * | 10/1987 | Arakawa et al. | 701/25 |
|---|---|---|---|---|---|
| 4,811,230 | A | * | 3/1989 | Graham et al. | 701/16 |
| 4,837,695 | A | * | 6/1989 | Baldwin | 701/15 |
| 4,837,696 | A | * | 6/1989 | Lebrun et al. | 701/15 |
| 5,408,413 | A | | 4/1995 | Gonser et al. | |
| 6,088,654 | A | * | 7/2000 | Lepere et al. | 701/301 |
| 6,134,500 | A | | 10/2000 | Tang et al. | |
| 7,158,052 | B2 | * | 1/2007 | Zammit-Mangion et al. | 340/959 |
| 7,364,121 | B2 | * | 4/2008 | Firuz et al. | 244/175 |
| 7,751,951 | B2 | * | 7/2010 | Pitard et al. | 701/15 |
| 7,835,829 | B2 | * | 11/2010 | Villaume et al. | 701/15 |
| 7,885,734 | B2 | * | 2/2011 | Lemoult et al. | 701/15 |
| 7,889,133 | B2 | * | 2/2011 | Smith et al. | 342/450 |
| 8,068,950 | B2 | * | 11/2011 | Duggan et al. | 701/24 |
| 8,380,372 | B2 | * | 2/2013 | Michal et al. | 701/15 |
| 2007/0124034 | A1 | * | 5/2007 | Pitard et al. | 701/15 |
| 2008/0071434 | A1 | | 3/2008 | Fortier et al. | |
| 2008/0103645 | A1 | | 5/2008 | DeMers et al. | |
| 2008/0300738 | A1 | | 12/2008 | Coulmeau et al. | |
| 2009/0204453 | A1 | | 8/2009 | Cooper et al. | |
| 2010/0094488 | A1 | * | 4/2010 | Michal et al. | 701/15 |
| 2010/0222946 | A1 | * | 9/2010 | Sauvinet | 701/15 |
| 2012/0078451 | A1 | * | 3/2012 | Ohtomo et al. | 701/15 |

* cited by examiner

*Primary Examiner* — James Trammell
*Assistant Examiner* — Jean-Paul Cass
(74) *Attorney, Agent, or Firm* — Novak Druce Connolly Bove + Quigg LLP

(57) ABSTRACT

An optimization method and device for a take-off procedure of an aircraft. The device (1) comprising means (2, 10) for determining optimum values for take-off parameters and adapting them for the actual take-off conditions.

4 Claims, 3 Drawing Sheets

METHOD AND DEVICE FOR OPTIMIZING A TAKEOFF PROCEDURE OF AN AIRCRAFT

CROSS-REFERENCE TO RELATED APPLICATIONS

This application claims priority to French Patent Application 0904202, filed Sep. 4, 2009, the entire contents of which are incorporated herein by reference.

FIELD OF THE INVENTION

The present invention relates to an optimization method and device for a take-off procedure of an aircraft, particularly a civil transport aircraft.

BACKGROUND OF THE INVENTION

In the framework of the present invention, the take-off procedure refers to the part of the take-off that connects the end of the actual take-off phase, for example at 35 feet (about 10 meters), to the point which marks the beginning of the ascending phase (speed of 250 knots, about 130 meters/sec, clean configuration). Such take-off procedure is defined under the form of a vertical profile that should be followed by the aircraft. The take-off procedure depends inter alia on the following elements:
  the characteristics of the take-off airport (runway, obstacles, weather conditions);
  data (engine speed upon take-off and, upon the ascent, take-off aerodynamic configuration) being defined by an operator, particularly the pilot; and
  data being imposed by the air control authorities (speed and altitude stresses).

The main operations to be implemented during the take-off procedure are as follows:
  change of the engine speed (from the take-off speed to the ascent speed);
  acceleration (towards the speed imposed by the air control); and
  change of the take-off aerodynamic configuration towards a clean configuration (slats and flaps being retracted).

The take-off procedure is further characterised by a high number of stresses, namely in particular regulating stresses so as to provide the required safety conditions, stresses due to the air control and stresses imposed by the aircraft systems.

Presently, the above mentioned operations are generally implemented by the pilot following a procedure being determined during the flight preparation and which is declared to the air control authorities before the aircraft departure. The possible procedures are simple, but are not optimized. Such procedures come generally from definitions provided by the International Civil Aviation Organization (ICAO). The International Civil Aviation Organization proposes two different departure procedures, namely a procedure ICAOA and a procedure ICAOB.

With more precision:
  the procedure ICAOA is recommended to reduce noise in the inhabited zones near the airports. In such a case, thrust is reduced before starting to accelerate and change the aerodynamic configuration of the aircraft; and
  the procedure ICAOB is recommended to reduce noise in the zones located far from airports. In such a case, the acceleration (and thus the resulting slats and flaps being retracted) is carried out at the take-off speed and thrust is reduced when the clean configuration (with slats and flaps completely retracted) is reached.

The procedures ICAOA and ICAOB have been generalized so as to minimize noise. The (more general) resulting procedures are called procedures NADP (Noise Abatement Departure Procedure). However, such procedures NADP are fixed and not optimized or able to be optimized with respect to different criteria or particular objectives, such as for example the ecological impact or the economic cost of a take-off.

It is known that the civil aviation presently seeks to improve the ecological impact of the airplanes. Such environmental awareness concerns all components of the air transport, namely the authorities (airport, air traffic and aircraft certification), the airframe manufacturers, the engine manufacturers and the airway companies.

It is known that the environmental impact in the airport surroundings can be defined by the noise being caught on the ground, by the air quality, in particular via $NO_x$ production, and by the contribution to weather change, mainly represented by $CO_2$ production. More precisely:
  as regards noise, the very particular specificities of each airport (altitude, obstacles, inhabited zones in the surroundings, climate, etc.) make that presently surcharges regarding the operational noise depend on each airport; and
  as regards $CO_2$ and $NO_x$ emissions, there is a strong will to impose airport surcharges, but the new regulations, in particular the addition of a $CO_2$ production tax at the fuel cost, are still in an investigation phase.

Moreover, the economic cost minimization both regards fuel consumption, flight durations and use of engines. In addition, it is obviously appropriate to minimize the economic cost while respecting flight safety as well as air traffic stresses.

Consequently, the presently used take-off procedures are not adapted for the multiplicity of operational objectives and mainly for their characters being sometimes contradictory.

SUMMARY OF THE INVENTION

The present invention relates to an optimization method for the take-off procedure of an aircraft, which can remedy such drawback.

To this end, according to the invention, said optimization method for a take-off procedure (which is defined through a plurality of take-off parameters), is remarkable in that:
  A/ at a preliminary step:
  a) means are provided to be able for an operator to input reference take-off conditions corresponding to conditions in which it is supposed that the aircraft take-off will be carried out;
  b) through said input reference take-off conditions and a multi-criteria optimization algorithm, a plurality of sets of values is automatically determined, said sets of values comprising each the values of the same parameters amongst at least some of said tale-off parameters, and, for each of said sets of values, the values of said set are such that they optimize simultaneously a plurality of criteria related to take-off;
  c) means are provided to be able for an operator to input, for each of said criteria, a relevant cost; and
  d) through said relevant costs being input at step c), one of said sets of values is automatically selected, the so-selected set representing a set of reference values of said take-off parameters; and
  B/ before take-off:
  a) means are provided to be able for an operator to input actual take-off conditions corresponding to conditions in which the take-off will be effectively carried out;

b) through said set of reference values being selected at step A/d), a set of optimum values is automatically calculated for said take-off parameters, said optimum values being adapted for said actual take-off conditions; and c) means are provided for transmitting such set of optimum values to a flight management system that uses them to define the take-off procedure being implemented upon take-off.

Thus, thanks to the invention, a set of optimum values is determined for at least some of the take-off parameters, enabling to define the take-off procedure implemented upon take-off of an aircraft, in particular a civil transport aircraft.

In addition, according to the invention, such a set of optimum values is obtained taking into account and simultaneously optimizing a plurality of criteria related to take-off, which will be detailed hereinafter. By simultaneous optimization of several criteria, it meant to look for optimum values (for take-off parameters), for which the best compromise possible is reached for the set of criteria being considered. Consequently, in such a case, the criteria being considered are not necessarily, individually, in their most favourable condition, but, taken together, those criteria have respective conditions corresponding to the best compromise possible (relative to the costs being input by the pilot).

Consequently, thanks to the invention, it is possible to optimize the take-off procedure depending on a plurality of operational criteria (or objectives) with sometimes contradictory characters. Preferably, said criteria comprise at least some of the following criteria:
- a pollutant emission under a predetermined altitude;
- a noise at a predetermined distance of the runway used for take-off;
- an average noise around the airport;
- an acoustic footprint on the ground;
- a use duration of the take-off speed;
- an ascent duration up to a cruising point; and
- a quantity of fuel being consumed up to a cruising point.

Moreover, such optimization is enhanced through adapting the take-off parameters to the actual take-off conditions.

In the framework of the present invention, the take-off parameters used for defining the take-off procedure, preferably of NADP type, comprise the following parameters:
- a speed enabling to define the initial acceleration upon take-off;
- a thrust reducing altitude;
- an intermediate thrust speed;
- an acceleration altitude;
- an intermediate speed; and
- an altitude of the take-off procedure end.

Moreover, advantageously, said (actual or referential) take-off conditions comprise:
- characteristics of the take-off airport;
- aircraft data being selected by a pilot of said aircraft; and
- data imposed by the air control authorities.

Further, in a preferred embodiment, at step B/b), the set of optimum values X is automatically determined for said take-off parameters through the following expression:

$$X = Xref + dXref/dp \, [p - pref]$$

wherein:
- Xref represents said set of reference values of said take-off parameters, being determined at step A/d);
- pref represents said reference take-off conditions; and
- p represents said actual take-off conditions.

At such step B/b), a re-adjustment of the reference values (which were calculated for reference take-off conditions) is thus carried out by adapting them to the actual take-off conditions, such re-adjustment enabling to obtain said optimum values.

The present invention also relates to an assistance method for aircraft take-off, which is remarkable in that:
- a set of optimum values of the take-off parameters is determined, which is transmitted to a flight management system of the aircraft by implementing the above mentioned method; and
- an optimum take-off procedure is defined through said flight management system by using said set of optimum values of the take-off parameters, said optimum take-off procedure being used (by the pilot or by aircraft systems) as a take-off assistance.

The present invention also relates to an optimization device of a take-off procedure of an aircraft, in particular a civil transport aircraft.

According to the invention, said device is remarkable in that it comprises:
- a first unit comprising:
  - means for an operator to be able to input reference take-off conditions corresponding to conditions in which it is supposed that the aircraft take-off will be carried out;
  - means for automatically determining, through said input reference take-off conditions and a multi-criteria optimization algorithm, a plurality of sets of values, said sets of values comprising each the values of the same parameters amongst at least some of said take-off parameters, and, for each of said sets, the values of said set are such that they optimize simultaneously a plurality of criteria related to take-off;
  - means for an operator to be able to input, for each of said criteria, a relevant cost; and
  - means for automatically selecting through said relevant costs being input, one of said sets of values, the so-selected set representing a set of reference values of said take-off parameters; and
- a second unit comprising:
  - means for an operator to be able to input actual take-off conditions corresponding to conditions in which the take-off will be effectively carried out;
  - means for automatically calculating, through said set of reference values, being determined by the first unit, a set of optimum values for said take-off parameters, said optimum values being adapted for said actual take-off conditions; and
  - means for transmitting such set of optimum values to a flight management system that uses them to define the take-off procedure being implemented upon take-off.

The present invention further relates to:
- an assistance take-off system both comprising a device such as the one above mentioned and a flight management system; as well as
- an aircraft comprising such a device and/or such take-off assistance system.

BRIEF DESCRIPTION OF THE DRAWINGS

Figures of the accompanying drawing will be make well understood how the invention can be implemented. On such figures, identical annotations designate similar elements.

DETAILED DESCRIPTION

Figure 1:
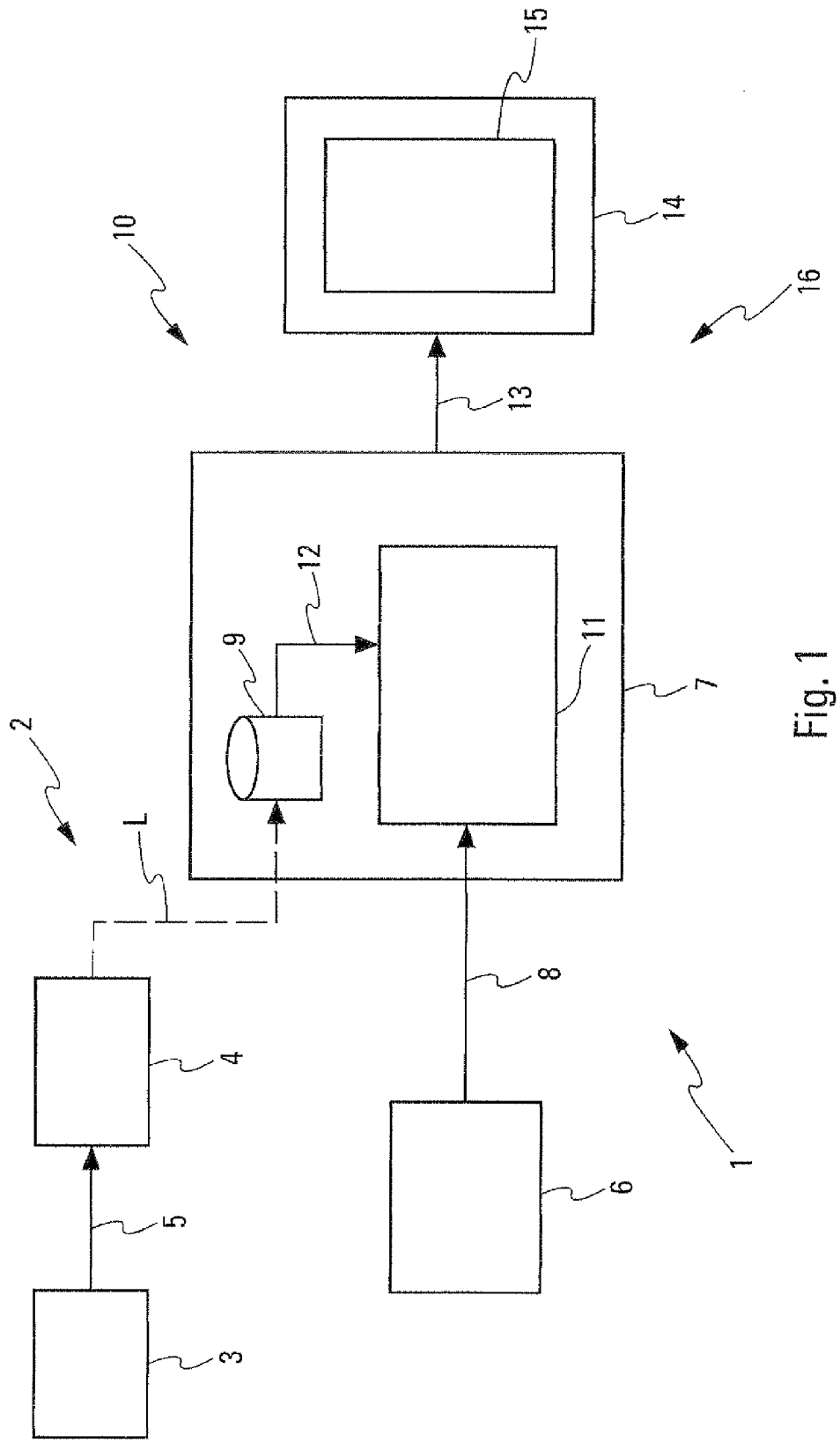
FIG. 1 is a block diagram of an optimization device according to the invention.

The device 1 according to the invention and shown schematically on FIG. 1 is provided for optimizing a take-off procedure of an aircraft, in particular a civil transport aircraft. In the framework of the present invention, said take-off procedure refers to the part of the take-off that connects the end of the actual take-off phase, for example at 35 feet (about 10 meters), to the point which marks the beginning of the ascending phase (speed of 250 knots, about 130 meters/sec, clean configuration). Such take-off procedure is usually defined under the form of a vertical profile that should be followed by the aircraft.

According to the invention, said device 1 comprises a unit 2 including a set of means for implementing a preliminary step generally well before take-off. Such unit 2 comprises:

usual means 3, for example a keyboard or a mouse being associated with a screen, for an operator, for example the pilot of the aircraft, to be able to input reference take-off conditions into the unit 2. Those reference take-off conditions correspond to conditions in which it is supposed that the aircraft take-off will be carried out later on; and means 4, being connected through a link 5 to said means 3 and comprising a first element, for automatically determining, through the reference take-off conditions being input via means 3 and an integrated multi-criteria optimization algorithm, a plurality of sets of values. Each of said sets of values comprises values of at least some of said take-off parameters used to define the take-off procedure. For each of said sets, the values of said set are such that they optimize a plurality of criteria related to take-off and detailed hereunder.

Through said integrated multi-criteria optimization algorithm, said first element of means 4 thus determines a plurality of sets of optimum values so as to be able to optimize together the criteria being considered. In the framework of the present invention, a multi-criteria optimization algorithm takes as input the conditions of a reference take-off (aircraft condition, weather conditions). The outputs of such algorithm are the sets of the variable values which define optimum reference take-off procedures. A trajectory is said to be optimum if it belongs to Pareto Front. The Pareto Front is defined by the sets of trajectories that verify that an improvement of one of the criteria degrades necessarily the remaining criteria.

The determination of the reference values will be explained with the help of FIGS. 2 and 3. On such FIGS. 2 and 3, two criteria C1 and C2 will only be taken into account to simplify the explanation.

In such example, said plurality of sets of values being determined by the first element of means 4 is illustrated by a plot P showing the set of compromises possible between C1 and C2. Such plot P allows to switch from the complete optimization of one (single) criterion (at point X1) to the complete optimization of the other criterion (at point X2) while proposing the set of compromise solutions.

With each of the points of such plot P a set of optimum values is associated for the take-off parameters being considered.

Figure 2:
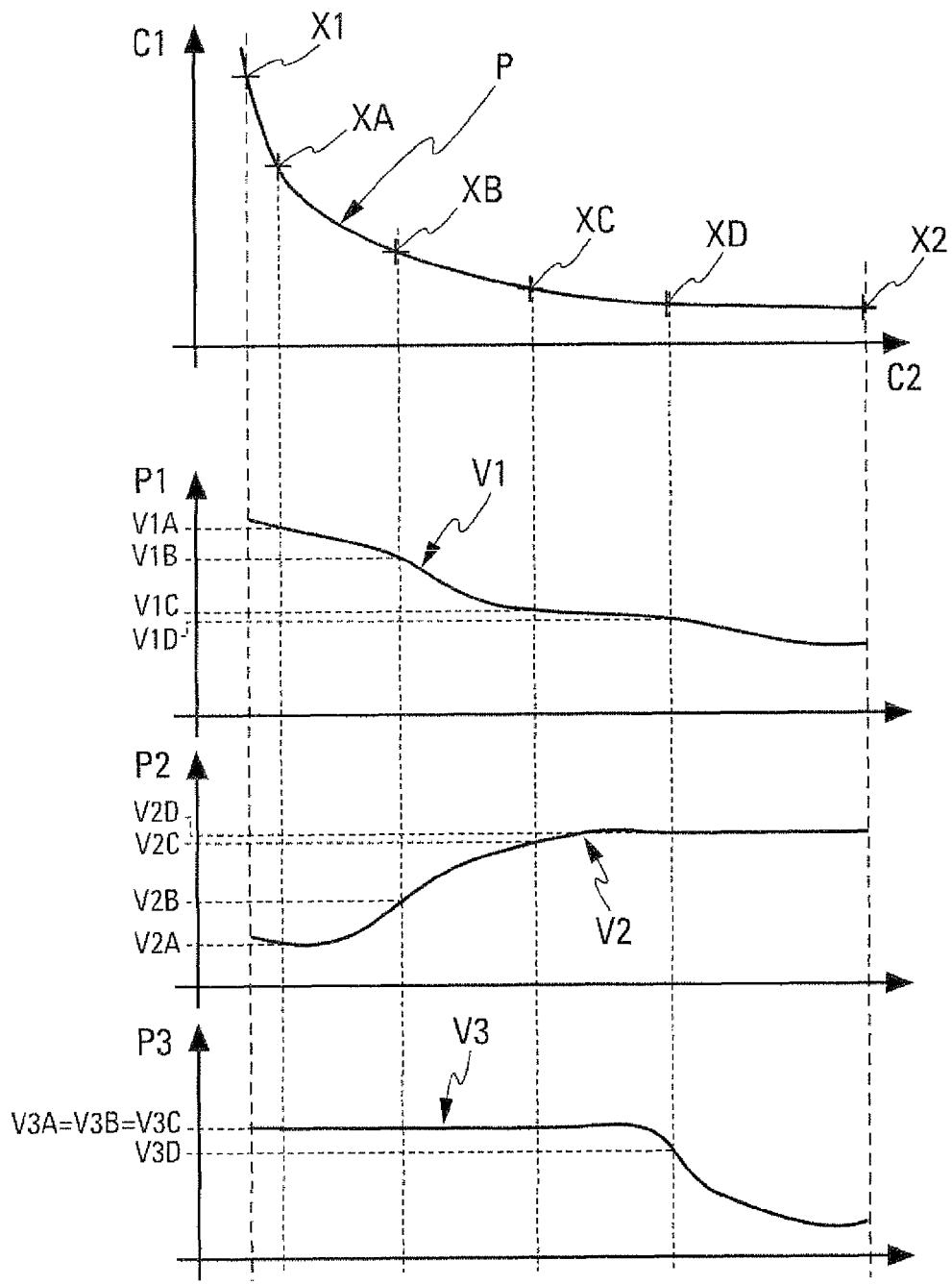
FIGS. 2 and 3 are plots for well explaining the determination of reference values for take-off parameters.
Figure 3:
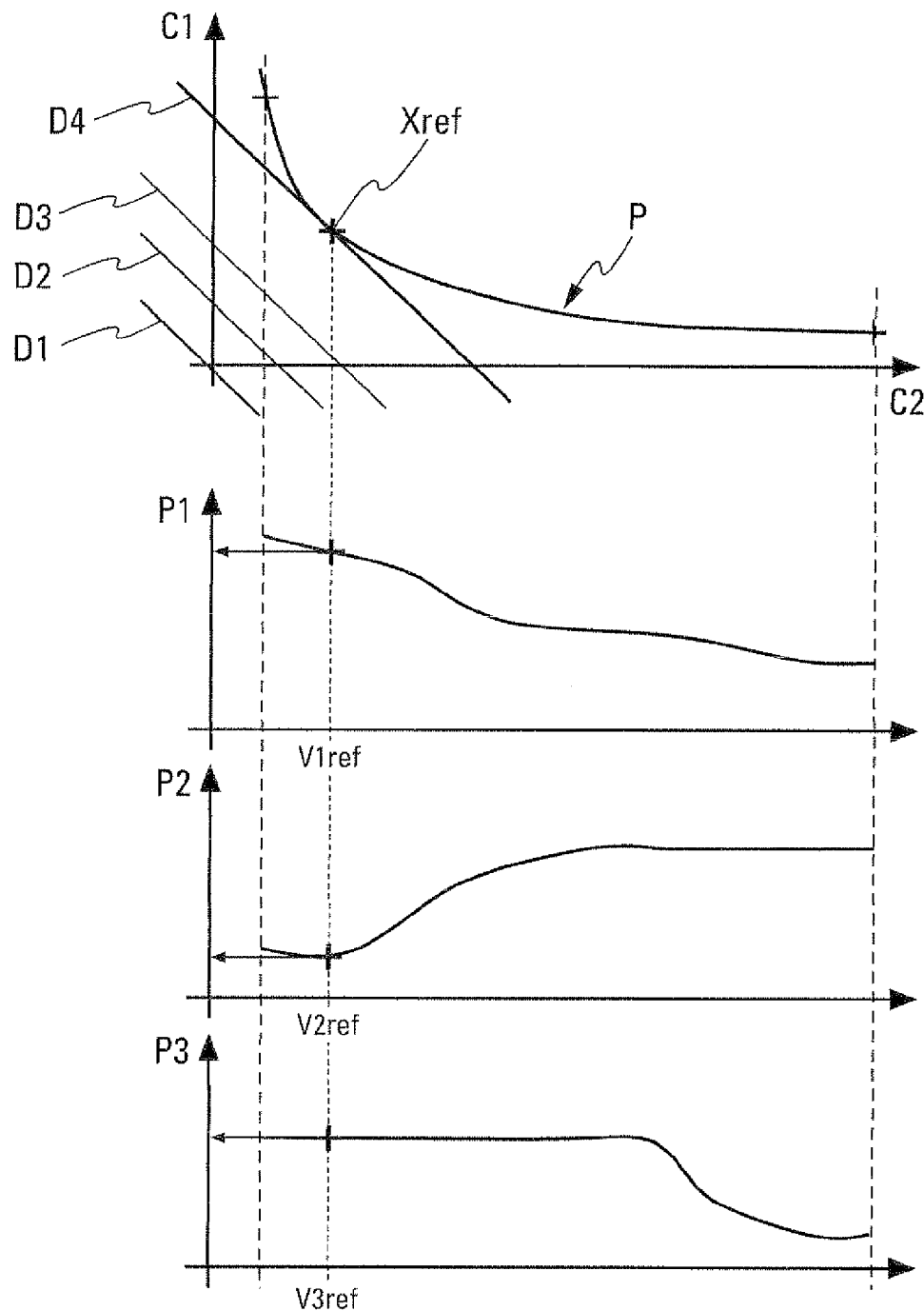

In the example of FIG. 2, three take-off parameters P1, P2 and P3 are considered having value plots V1, V2 and V3 associated with the plot P. For illustration, in such example, the parameters P1, P2 and P3 take respectively:

the values V1A, V2A and V3A for the point XA from P;
the values V1B, V2B and V3B for the point XB from P;
the values V1C, V2C and V3C for the point XC from P; and
the values V1D, V2D and V3D for the point XD from P.

Knowing the plot P, it is then convenient to select the adequate point of the latter. To do so, the unit 2 also comprises:

auxiliary means, in particular said means 3, which enable for an operator to input, for each of the criteria taken into account, a method so as to calculate the relevant cost; and a second element, non shown and integrated into said means 4, to select automatically through said input relevant costs, one of said sets of values previously determined by the first element. The thus selected set of values represents a set of reference values for said take-off parameters.

From the information being input by the operator, said second element of means 4 determines a set of plots D1, D2, D3 and D4 having different costs. The operator inputs in the device a general cost formula which depends in general on the optimized criteria. In the example of FIG. 3, D1<D2<D3<D4. Said second element seeks then the point of intersection Xref of the plot D4 associated with the smallest cost possible with the plot P, as shown on FIG. 3. The thus obtained point Xref then enables said means 4 to deduct the optimum values V1ref, V2ref and V3ref for the set of the parameters P1, P2 and P3 being considered.

The cost illustrating function may be not linear and even not continuous unlike the plots D1, D2, D3 and D4. According to the invention, such function expresses the monetary unit cost (for example in dollars) and aims at homogenizing the criteria expressed in non homogenous units (kilograms, decibels, minutes, etc.). To do so, the operator inputs for each criterion a method for calculating the relevant cost which is expressed in monetary unit and the means 4 deduct therefrom the overall relevant cost for the set of criteria being considered. The point Xref is the point of the plot P where the overall cost (associated with said criteria being considered) is the weakest.

According to the invention, said device 1 comprises in addition a unit 10 for adapting to the actual take-off conditions the values of the take-off parameters, so-called reference values, which have been determined by the unit 2 (depending on the reference take-off conditions, i.e. usual conditions such as average weather conditions or the take-off mean mass for the aircraft type being used).

The unit 10 comprises a set of means for implementing for that purpose an extra step, preferably just before take-off. More precisely, such unit comprises:

usual means 6, for example a keyboard or a mouse being associated with a screen, for an operator, for example the pilot of the aircraft, to be able to input in the device 1, generally just before take-off, the actual take-off conditions which correspond to conditions in which the aircraft take-off will be effectively carried out; and a calculation unit 7 which is connected to said means 6 through a link 8.

Such calculation unit 7 comprises inter alia:

a memory (or a data base) 9, in which as usual as illustrated through a link L in broken line, the set of reference values has been memorized, being determined by said means 4 in a way being detailed hereinabove; and calculation means 11 connected through a link 8 to said means 6 and through a link 12 to said memory 9 and which are made so as to automatically determine a set of optimum values for said take-off parameters. Said means 11 determine optimum values being adapted for the actual take-off conditions being input by the operator.

In a preferred embodiment, said calculation means 11 automatically calculate said set of optimum values X for said take-off parameters through the following expression:

$$X = Xref + dXref/dp\,[p - pref]$$

wherein:

Xref represents said set of reference values (V1ref, V2ref, V3ref) of said take-off parameters (P1, P2, P3), being determined by the unit 2;

pref represents said reference take-off conditions used for determining said reference values; and p represents said actual take-off conditions input through means 6.

In a preferred embodiment, the unit 2 is provided on the ground and determines the set Xref (and possibly the derivative dXref/dp which needs a high calculation capacity) on the ground, whereas the unit 10 is on the aircraft.

In addition, the device 1 comprises appropriate means so as to transmit the set of optimum values determined by said means 11 to a usual flight management system 14 on board the aircraft. In a preferred variation, such appropriate means comprise a data transmission link 13 for providing a direct transmission. Means such as a screen for example can also been provided, which give the optimum values to an operator, as well as means for an operator to be able to input those optimum values in the flight management system 14.

Such flight management system 14 uses the optimum values being determined by said means 11 so as to define in a usual way the take-off procedure implemented upon take-off.

To do so, said flight management system 14 can for example display said optimum values of the take-off parameters on a display screen 15 which is located in the cockpit so that the pilot accesses to this information. The flight management system 14 can also transmit such optimum values of the take-off parameters (or the relevant characteristics of the take-off procedure) to (non shown) systems of the aircraft.

In a preferred embodiment, said device 1 and said flight management system 14 belong to a take-off assistance system 16.

In the framework of the present invention, the take-off parameters used by the flight management system 14 to define the take-off procedure, preferably of the NADP type, comprise the following parameters:

a speed enabling to define the initial acceleration upon take-off;

a thrust reducing altitude;

a value TSP (Thrust Setting Parameters) that defines an intermediate thrust speed;

an acceleration altitude;

an intermediate speed of the procedure; and an altitude of anti-noise procedure end (restoration of the ascent thrust, acceleration towards the ascent speed).

The knowledge of the preceding parameters enables to define a vertical profile to be followed by the aircraft upon take-off and which indicates at which altitudes the following maneuvers have to be implemented:

change of the engine speed (from the take-off speed to the ascent speed);

acceleration (towards the speed imposed by the air control); and change of the take-off aerodynamic configuration towards a clean configuration (slats and flaps being retracted).

In a preferred embodiment, said device 1 determines the optimum values for all take-off parameters of the take-off procedure. However, it can be also envisaged that the device 1 determines the optimum values only for some of such take-off parameters, the pilot selecting for instance freely the values for the remaining take-off parameters.

Thus, the device 1 and the system 16 in accordance with the present invention allow for the optimum values to be calculated for the take-off parameters that optimize simultaneously a plurality of criteria being selected by the pilot, such as noise being caught, take-off cost and nitrogen oxide produced. More precisely, such optimum values allow for the best compromise possible to be obtained for the whole criteria being considered, which have sometimes contradictory effects. The device 1 and the system 16 thus calculate automatically procedures for minimizing the environmental impact of the aircraft while respecting a set of particular stresses.

The invention claimed is:

1. A method for optimizing a take-off procedure of an aircraft, wherein the take-off procedure comprises a plurality of take-off parameters, the method comprising:

receiving, via a processor on-board the aircraft, a plurality of reference take-off conditions, wherein each of the plurality of reference take-off conditions are input by an operator of the aircraft;

determining, via a processor on-board the aircraft, a plurality of sets, wherein each of the plurality of sets comprises at least one of the plurality of reference take-off conditions and a plurality of take-off criteria for the aircraft;

receiving, via a processor on-board the aircraft, a cost for each take-off criteria in each of the plurality of sets;

creating, via a processor on-board the aircraft, a selected set from the plurality of sets, wherein the selected set minimizes a total cost associated with the selected set, wherein the total cost is a sum of the cost for each take-off criteria in each of the plurality of sets;

receiving, via a processor on-board the aircraft, a plurality of actual take-off conditions, wherein each of the plurality of reference take-off conditions are input by the operator of the aircraft immediately prior to a take-off procedure, such that the plurality of actual take-off conditions represent current take-off conditions and may be the same as or different from the plurality of reference take-off conditions;

converting, via a processor on-board the aircraft, the selected set into an optimum set comprising a plurality of optimized take-off parameters, wherein each optimized take off parameter is given by the expression:

$$X = Xref + dXref/dp(p - pref)$$

wherein Xref represents a member of the selected set, wherein pref represents a reference take-off condition, wherein p represents an actual take-off condition;

defining a take-off procedure based on the optimum set; and implementing the take-off procedure upon take-off.

2. The method according to claim 1, wherein each of the plurality of optimized take-off parameters are selected from the group consisting of a take-off speed, a thrust reducing altitude, an intermediate thrust speed, an acceleration altitude, an intermediate speed, and an altitude indicating an end of a take-off procedure.

3. The method according to claim 1, wherein each of the plurality of reference take-off conditions are selected from the group consisting of an airport characteristic, a pilot-selected aircraft characteristic, a condition imposed by air control authorities.

4. The method according to claim 1, wherein each of the plurality of take-off criteria are selected from the group consisting of a pollutant emission under a predetermined altitude, noise at a predetermined distance of a runway used for take-off, an average noise around an airport, an acoustic footprint at ground level, a use duration of a take-off speed, an ascent duration up to an ascent end, and a quantity of fuel consumed.

\* \* \* \* \*